US012750343B2

(12) United States Patent
Fintel et al.

(10) Patent No.: US 12,750,343 B2
(45) Date of Patent: Sep. 29, 2026

(54) DEFAULT-DENY NETWORK EGRESS ARCHITECTURE IN A VIRTUAL PRIVATE CLOUD

(71) Applicant: CrowdStrike, Inc., Sunnyvale, CA (US)

(72) Inventors: Jeremy Fintel, Austin, TX (US); Belmin Fernandez, Astoria, NY (US); Brian Hodges, Shoreline, WA (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/509,940

(22) Filed: Nov. 15, 2023

(65) Prior Publication Data

US 2025/0158965 A1 May 15, 2025

(51) Int. Cl.
*H04L 9/40* (2022.01)

(52) U.S. Cl.
CPC ...... *H04L 63/0272* (2013.01); *H04L 63/0236* (2013.01); *H04L 63/029* (2013.01); *H04L 63/101* (2013.01)

(58) Field of Classification Search
CPC .. H04L 63/0272; H04L 63/101; H04L 63/029
See application file for complete search history.

(56) References Cited

U.S. PATENT DOCUMENTS 9,160,711 B1 * 10/2015 Sweet ................. H04L 63/1458
9,660,886 B1 * 5/2017 Ye ........................... H04L 45/02
10,484,331 B1 * 11/2019 Rossman ............ H04L 63/0209
10,587,637 B2 * 3/2020 Hu ....................... H04L 43/0835
10,719,369 B1 * 7/2020 Aithal ................. H04L 63/0263
10,938,787 B2 * 3/2021 Desai ....................... H04L 12/66
11,595,432 B1 * 2/2023 Vella ................... H04L 63/1458
11,838,374 B2 * 12/2023 Schuller ................ H04L 67/025
12,368,613 B1 * 7/2025 Lin ......................... H04L 45/66

(Continued)

OTHER PUBLICATIONS

Vouteva, Stella et al., "Automated configuration of BGP on edge routers", Research Paper University of Amsterdam, Aug. 14, 2015, 66 pages. (Year: 2015).*

(Continued)

*Primary Examiner* — Michael Pyzocha
(74) *Attorney, Agent, or Firm* — Lee & Hayes, P.C.

(57) ABSTRACT

Methods and systems for designing a default-deny network egress control architecture in a virtual private cloud (VPC) environment are described herein. According to an implementation, the system may create a first subnet in a private computer network to perform egress control. The system implements a private network address translation (NAT) gateway, a network access control list (NACL), and a private elastic network interface (ENI) in the first subnet. The first subnet may be referred to as a "blackhole subnet" or a "terminating subnet." Upon receiving a traffic destined to a public computer network, e.g., Internet, the private NAT gateway may determine whether the traffic is authorized to egress based on the NACL. The private NAT gateway forwards the traffic to the private ENI to discard the traffic if the traffic is not authorized to egress and logs the information associated with the traffic.

20 Claims, 6 Drawing Sheets

(56) References Cited

U.S. PATENT DOCUMENTS

| | | | | |
|---|---|---|---|---|
| 2007/0104197 | A1* | 5/2007 | King | H04L 63/0263 370/392 |
| 2008/0127338 | A1* | 5/2008 | Cho | G06F 21/566 726/22 |
| 2011/0107413 | A1* | 5/2011 | Chawla | H04L 63/0227 726/12 |
| 2012/0222106 | A1* | 8/2012 | Kuehl | H04L 63/0209 726/11 |
| 2014/0096251 | A1* | 4/2014 | Doctor | H04L 63/1441 726/23 |
| 2014/0195380 | A1* | 7/2014 | Jamtgaard | G06Q 30/0601 709/224 |
| 2014/0331308 | A1* | 11/2014 | Smith | H04L 63/1441 726/11 |
| 2016/0078236 | A1* | 3/2016 | Chesla | G06F 21/604 726/1 |
| 2016/0234186 | A1* | 8/2016 | Leblond | H04L 67/34 |
| 2017/0093891 | A1* | 3/2017 | Mitchell | H04L 47/2483 |
| 2018/0013787 | A1* | 1/2018 | Jiang | H04L 43/16 |
| 2018/0020016 | A1* | 1/2018 | Hu | H04L 63/1458 |
| 2018/0115519 | A1* | 4/2018 | Bonomi | H04L 63/1458 |
| 2018/0332064 | A1* | 11/2018 | Harris | G06F 15/16 |
| 2018/0351904 | A1* | 12/2018 | Mizik | G06F 9/445 |
| 2019/0020723 | A1* | 1/2019 | Kumar | H04L 63/029 |
| 2020/0007548 | A1* | 1/2020 | Sanghavi | H04L 63/0236 |
| 2020/0036617 | A1* | 1/2020 | Raj | H04L 43/10 |
| 2021/0006594 | A1* | 1/2021 | Wang | H04L 63/0263 |
| 2021/0266331 | A1* | 8/2021 | Meshi | H04L 63/1425 |
| 2021/0385194 | A1* | 12/2021 | Kulkarni | H04L 63/104 |
| 2023/0342235 | A1* | 10/2023 | Kawagita | G06F 11/0766 |
| 2023/0370424 | A1* | 11/2023 | Parla | H04L 63/029 |
| 2024/0129275 | A1* | 4/2024 | Van Oort | H04L 65/102 |

OTHER PUBLICATIONS

"Explanation of how pi-hole works", pi-hole.net discussion, Dec. 18, 2018, 2 pages. <https://discourse.pi-hole.net/t/explanation-of-how-pi-hole-works/15082> (Year: 2018).*

* cited by examiner

DEFAULT-DENY NETWORK EGRESS ARCHITECTURE IN A VIRTUAL PRIVATE CLOUD

BACKGROUND

For the purposes of improving security posture and maintaining general security hygiene, it is preferred to build a computer network with a default-deny egress. For a computer network not originally built with egress control, one cure is to design an egress architecture using existing network elements to implement a default-deny egress control policy. Existing solutions do not provide proper visibility of the traffic leaving the network through an unapproved path. There is a need for implementing egress control while maintaining a robust network visibility of the egress traffic that does not take an approved and monitored path to the Internet.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
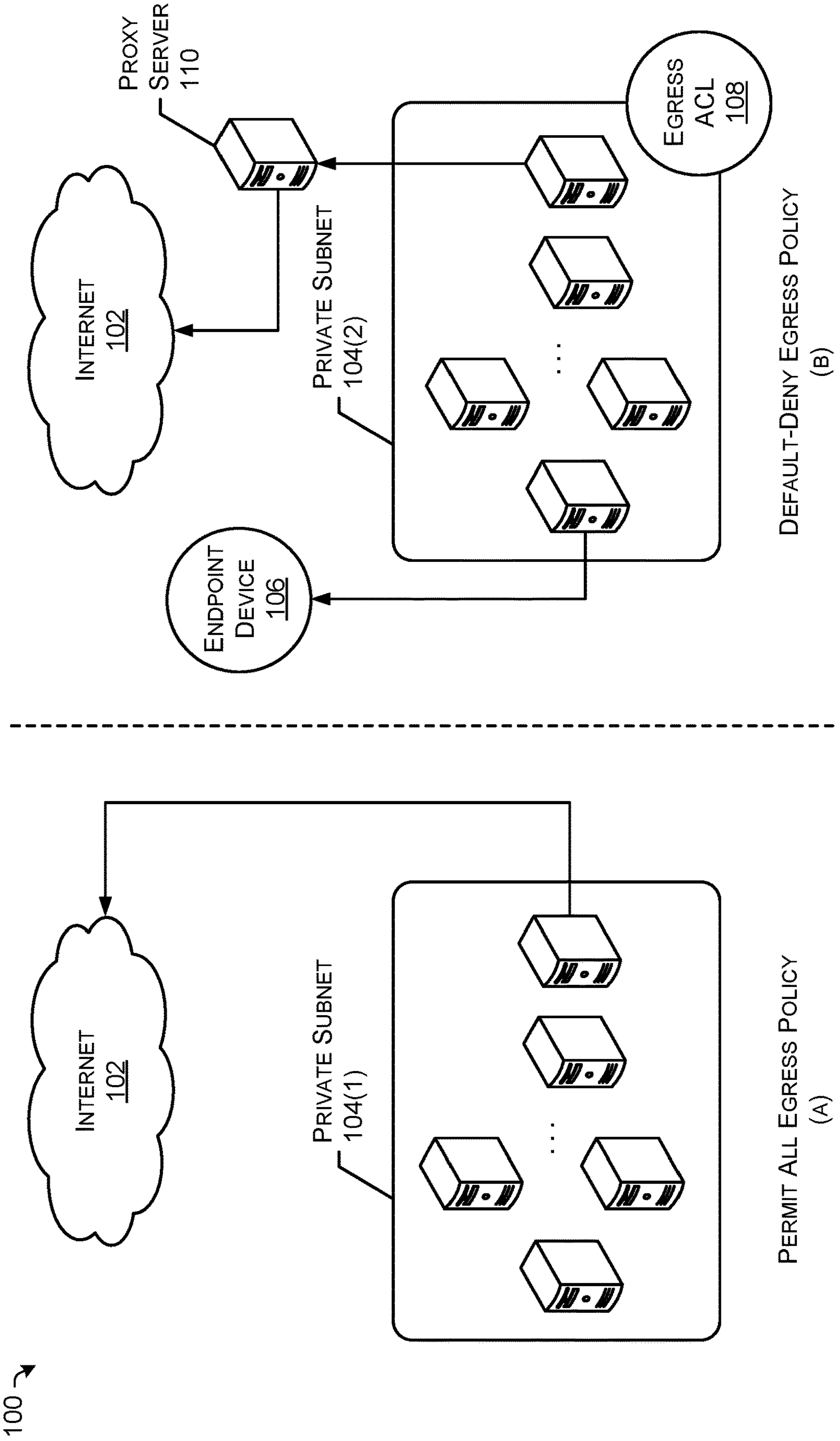
FIG. 1 illustrates an example network scenario with different egress control policies, according to an example of the present disclosure.

Techniques for designing a default-deny network egress control architecture in a virtual private cloud (VPC) environment are disclosed herein.

In implementations, the default-deny network egress control may be implemented in a cloud environment. Alternatively or additionally, the default-deny network egress may be applied to a data center environment.

In some examples, a computer system may create one or more VPCs in a cloud environment. The computer system may configure a VPC to host a private subnet that performs null route of unauthorized data traffic destined to Internet. The private subnet that performs null route of unauthorized data traffic destined to Internet may be referred to as a "blackhole subnet" or "terminating subnet." The computer system may further configure default routes in all other private subnets (i.e., the non-blackhole subnets) in the cloud environment to route the data packets destined to Internet to the blackhole subnet.

In implementations, the computer system may deploy a private network address translation (NAT) gateway in the blackhole subnet. The private NAT gateway may be configured to receive and triage ingress data traffic to different routes based on the destination IP addresses associated therewith. The ingress data traffic to the private NAT gateway of the blackhole subnet may be from a private subnet in the same VPC as the one hosting the blackhole subnet and/or from a private subnet in a different VPC.

In some examples, the private NAT gateway may be configured to route a data packet with a destination IP address 0.0.0.0/0 to a private elastic network interface (ENI) of the blackhole subnet. In some examples, the computer system may further maintain a network access control list (NACL) in the blackhole subnet. The NACL may be configured to include an allow list of certain types of data traffic that would be allowed to egress, e.g., domain name system (DNS) service, network time protocol (NTP) service, proxy service, etc. By way of example but without limitation, the allow list of NACL may include email addresses, IP addresses, domain names, and applications associated with these data traffic.

In implementations, the private NAT gateway may be configured to monitor the ingress data traffic from other private subnets in the cloud environment. Once an authorized attempt to egress is detected, the private NAT gateway may route the data packet to the ENI according to the configuration of NACL and log the authorized attempt in a VPC flow log.

In some examples, unauthorized egress attempts from other non-blackhole subnets may be further routed to the private NAT gateway in the blackhole subnet to achieve default-deny egress control.

The present disclosure designs a network architecture that null routes all egress traffic which did not follow a network path through an egress proxy by using AWS cloud engineering constructs such as private network address translation (NAT) gateway, subnet network access control lists (NACLs) and private elastic network interfaces (ENIs). The configuration and implementation of these technologies achieves null routing or blackhole routing with proper logging. According to the present disclosure, network packets that follow the blackhole route can be logged and monitored by way of VPC flow logs captured at the edge of the blackhole route.

Example implementations are provided below with reference to the following figures.

FIG. 1 illustrates an example network scenario 100 with different egress control policies, according to an example of the present disclosure.

FIG. 1(A) illustrates an example network that implements a permit all egress policy, while FIG. 1(B) illustrates an example network that implements a default-deny egress policy.

According to the permit all egress policy as shown in FIG. 1(A), outbound traffic from a private subnet 104(1) to Internet 102 may be always allowed regardless of the identity, IP address, and geolocation of the entity in the private subnet 104(1). The private subnet 104(1) may be implemented on a virtual private cloud (VPC) in a cloud environment such as Amazon Elastic Compute Cloud (EC2). In some examples, the private subnet 104(1) may include a plurality of computer servers with pooled and centralized server resources related to application content, storage, and/or processing power.

According to the default-deny egress policy as shown in FIG. 1(B), outbound traffic from a private subnet 104(2), i.e., the traffic with a destination IP address outside the range of the private subnet, may be denied egressing to Internet except those associated with an allow list. In some examples, an egress access control list (ACL) 108 may be implemented by one or more computer servers of the private subnet 104(2). The egress ACL 108 may be configured to allow certain traffic to be egressed to the Internet 102, for examples, a traffic associated with a domain name system (DNS) service, a traffic associated with a network time protocol (NTP) service, a traffic associated with a proxy service, etc. The egress ACL 108 may maintain an allow list that includes but not limited to, email addresses, IP addresses, domain names, applications, etc. Entities in the allow list may be authorized to access resources beyond the private subnet 104(2). In some examples, a proxy server 110 may establish an HTTP connect tunnel for traffic associated with these entities in the allow list.

In some examples, the egress ACL 108 may be further configured to deny unauthorized egress traffic, e.g., any traffic not related to the allow list. Unauthorized egress traffic may not be allowed to egress the private subnet 104(2), but instead, may be routed to an endpoint device 106 and terminated at the endpoint device 106. Information associated with such unauthorized egress attempts may be logged at the egress ACL 108. As discussed herein, the information associated with such unauthorized egress attempts may include IP address of the computer server from which, the unauthorized egress attempt is received, an application running on the computer server that initiated the unauthorized egress attempt, an email address from which, the unauthorized egress attempt is generated, etc.

It should be appreciated that the network scenario shown in FIG. 1 is merely for the illustration purpose. The network scenario may further include one or more computer device, storage devices, and/or cloud containers, etc., implemented in a network environment or a cloud environment. The egress control policies discussed herein, may also be implemented by the storage devices and/or cloud containers.

Figure 2:
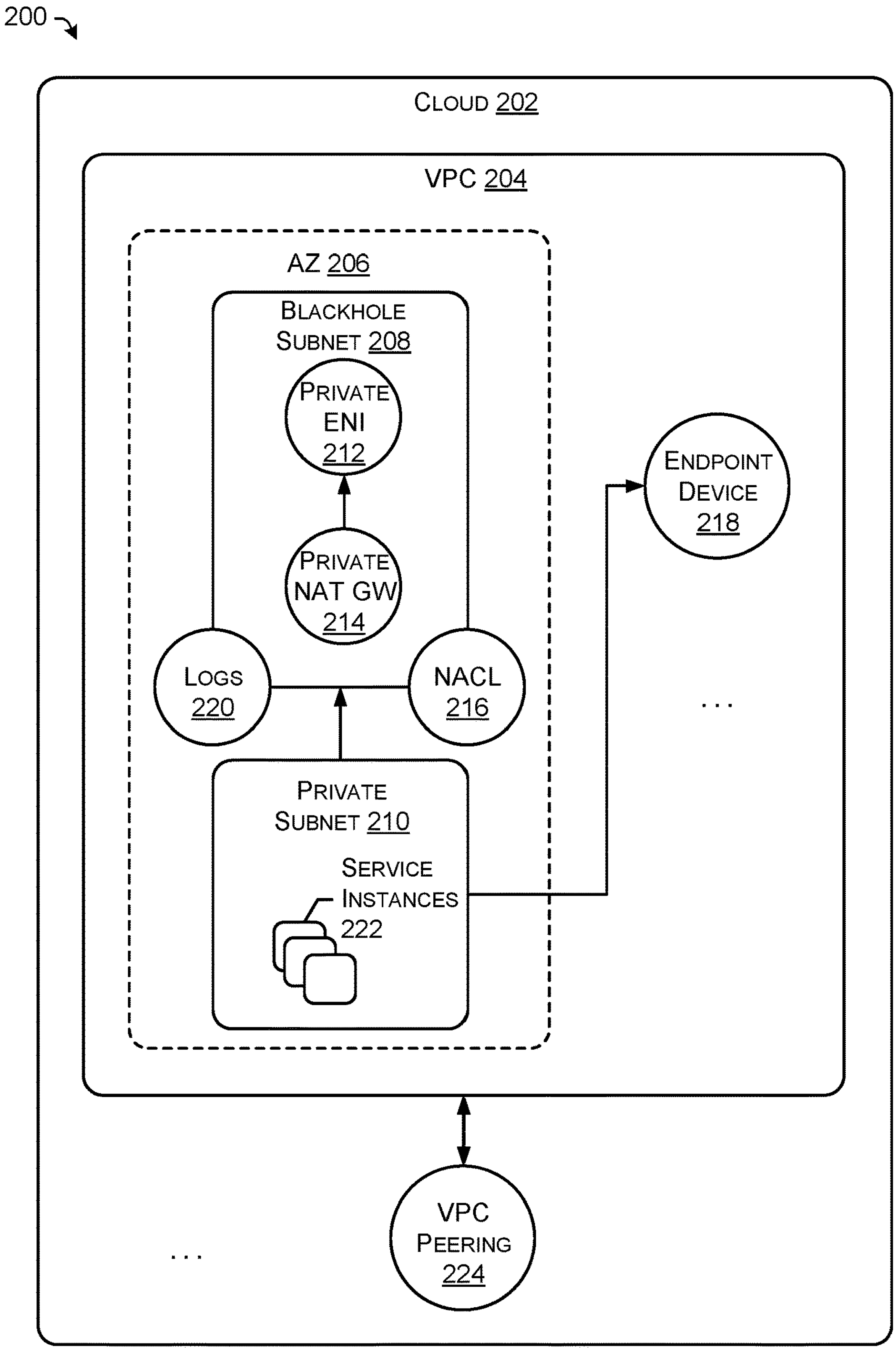
FIG. 2 illustrates an example network scenario, in which, a default-deny network egress control is implemented according to an example of the present disclosure.

FIG. 2 illustrates an example network scenario, in which, a default-deny network egress control is implemented according to an example of the present disclosure.

The network scenario 200, in which, a default-deny network egress control is implemented, may be any cloud environment, e.g., cloud 202. The cloud environment may be provided through Amazon AWS, Google Cloud Platform, Oracle Cloud, Microsoft Azure, IBM Cloud, etc. In a cloud environment, one or more virtual private cloud (VPC) may be created to launch the cloud resources in a logically isolated virtual network that the user has defined. VPC 204, for example, may be created in the cloud 202 to implement the default-deny network egress control.

As shown in FIG. 2, the VPC 204 may include a private subnet 210 and a blackhole subnet 208. The private subnet 210 may include a plurality of service instances 222, for example, Amazon EC instances. By way of example but without limitation, the plurality of service instances 222 may include general purpose instances, compute optimized instances, memory-optimized instances, accelerated computing instances, storage optimized instances, etc.

The blackhole subnet 208 may be configured to achieve blackhole routing for unauthorized egress attempts with proper logging of those unauthorized egress attempts. Unauthorized egress traffic may be terminated or dropped out at the blackhole subnet 208. Network packets that follow the blackhole route may be logged and monitored by way of VPC flow logs captured at the edge of the blackhole route.

In some examples, the blackhole subnet 208 may include network access control list (NACL) 216 configured to deny all data packets destined to the Internet (e.g., 0.0.0.0/0). The blackhole subnet 208 may further include a private network address translation (NAT) gateway 214 configured to route the data packets destined to the Internet to a private elastic network interface (ENI) 212. The private NAT gateway 214 may maintain a route table that defines routes for data packets with IP address 0.0.0.0/0 to be directed to the private ENI 212. As discussed herein, egress traffic from the VPC 204 may be monitored by the private NAT gateway 214 and data packets destined to the Internet may be rejected by the private NAT gateway 214. Information associated with the data packets denied at the private NAT gateway 214 may be logged at logs 220.

The NACL 216 may also define an allow list that authorizes certain IP addresses, domain names, email addresses, applications, etc., to access the resources in the Internet.

In some examples, the private subnet 210 and the blackhole subnet 208 may be in a same available zone (AZ), e.g., AZ 206, of the VPC 204. Although the VPC 204 is shown to include one available zone, AZ 206, the present disclosure is not intended to be limiting. A virtual private cloud may include one or more available zones. The virtual private cloud may also include one or more endpoint devices that allow communication between the service instances in the VPC and the services. For example, endpoint device 218 may be configured to allow communication between the plurality of service instances 222 with the services in other VPCs and/or data centers. The endpoint device 218 may be a gateway type endpoint device. In some examples, the endpoint device may be configured as an interface type endpoint device.

As discussed herein, the cloud 202 may include one or more virtual private cloud (VPC) other than the VPC 204, as shown in FIG. 2. The cloud 202 may further include a VPC peering 224 that enables the routing of network traffic between the VPC 204 and another VPC (not shown).

Figure 3:
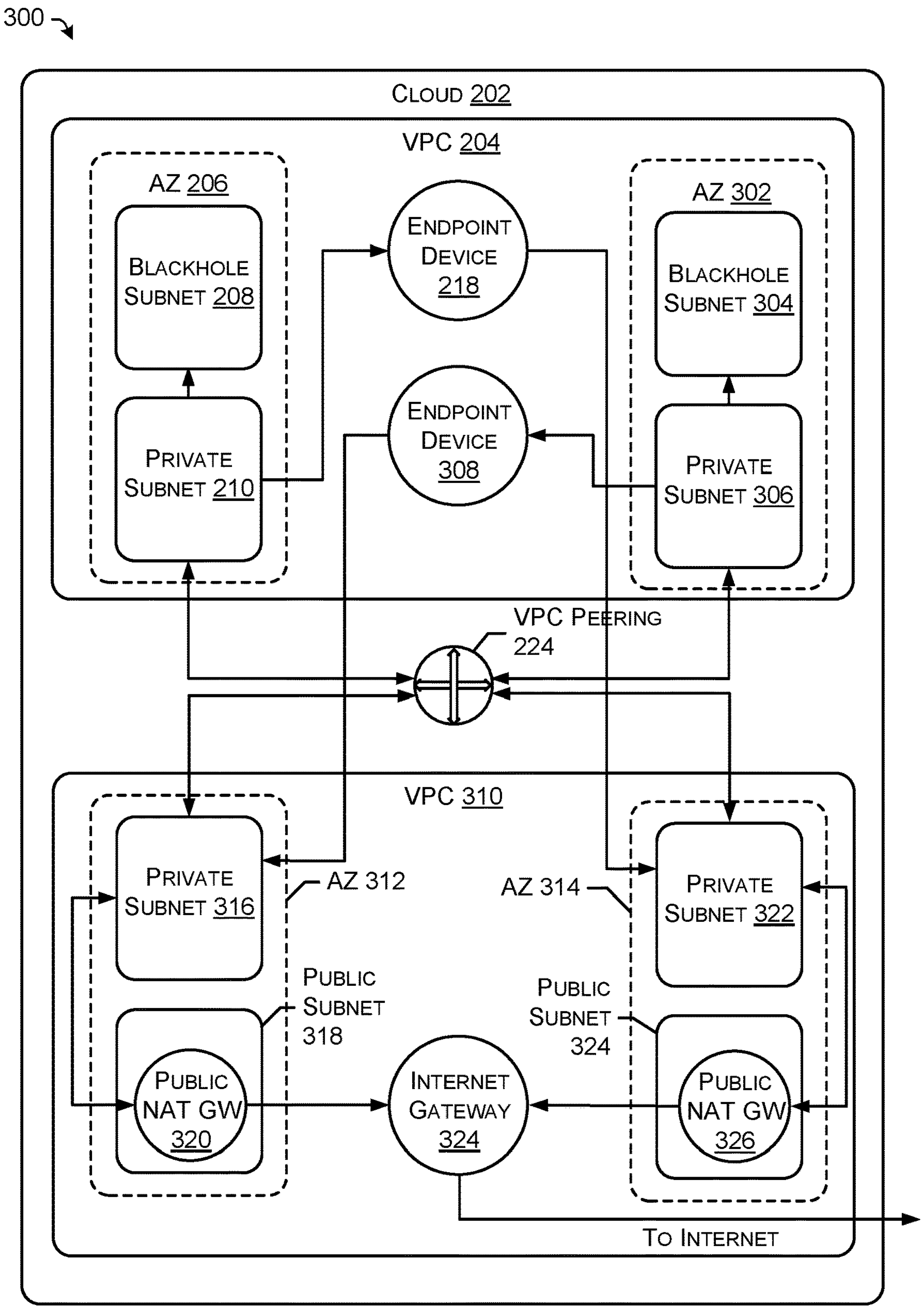
FIG. 3 illustrates another example network scenario, in which, a default-deny network egress control is implemented according to another example of the present disclosure.

FIG. 3 illustrates another example network scenario, in which, a default-deny network egress control is implemented according to another example of the present disclosure.

According to the network scenario 300, the VPC 204 may be configured to process the egress traffic from the private subnets included therein and the private subnets in other VPC of the cloud 202.

The VPC 204 may include a second available zone, e.g., AZ 302. Similar to AZ 206, AZ 302 may also include a private subnet 306 and a blackhole subnet 304. The blackhole subnet 304 may be similarly configured as a terminating subnet for unauthorized egress traffic. The blackhole subnet 304 may implement a NACL, a private NAT gateway, and a private ENI, which are similar to the NACL 216, the private NAT gateway 214, and the private ENI 212 of the blackhole subnet 208 shown in FIG. 2. The private subnet 306 may include a plurality of service instances, which are similar to the service instances 222 shown in FIG. 2.

The cloud 202 shown in the network scenario 300 may include a second VPC 310 configured with two available zones, AZ 312 and AZ 314. Each of the available zones may implement a private subnet, e.g., private subnet 316 in AZ 312 and private subnet 322 in AZ 314.

The private subnet 316 may include multiple service instances. When a default-deny egress control policy is implemented, the data packets destined to Internet may be captured and rejected by a private NAT gateway deployed at the edge of a null route or a blackhole route. The route table associated with the private subnet 316 may define a default route for data packets destined to the Internet (e.g., 0.0.0.0/0) to a private NAT gateway in a blackhole subnet. For example, the data packets with the IP address 0.0.0.0/0 from the private subnet 316 of the VPC 310 may be routed to the blackhole subnet 208 of the VPC 204 through VPC peering 224. The private NAT gateway 214 of the blackhole subnet 208 may refer to the NACL 216 and route the data packets with the IP address 0.0.0.0/0 from the private subnet 316 of the VPC 310 to the private ENI 212. Information related to the data packets data packets may be logged at the logs 220 of the blackhole subnet 208.

In some examples, the multiple service instances of the private subnet 316 may be related to core cloud services, DNS services, network time protocol (NTP) services, proxy services, etc. The data packets from the private subnet 316 may be related to one or more of the core cloud services, DNS services, NTP services, or proxy services, etc. According to the configuration of the NACL associated with the private subnet 316, these types of data packets may be allowed to reach the resources in Internet. These types of data packets from the private subnet 316 may be routed to a public NAT gateway 320 located in the same available zone and further to Internet through an Internet gateway 324 of the VPC 310. In some examples, the private subnet 316 may maintain an NACL to define those traffic that is allowed to egress to the Internet, for example, traffic from certain IP addresses, domain names, email addresses, applications, etc.

In implementations, to achieve default-deny egress control, at least one subnet in a cloud environment may be configured as the blackhole subnet (e.g., blackhole subnet 208), or the terminating subnet. A NACL of the blackhole subnet (e.g., the NACL 216) may define an allow list to allow certain traffic to egress to the Internet. A private NAT gateway (e.g., the private NAT GW 214) may maintain a route table that define default routes for data packets destined to the Internet (e.g., IP address 0.0.0.0/0) to be directed to a private ENI (e.g., the private ENI 212). These egress data packets may be dropped out at the private ENI and information related to the egress attempts may be logged by VPC flow logs (e.g., the logs 220). In some examples, all other private subnets (i.e., the non-blackhole subnets) in the cloud environment may each define a default route for data packets with IP address 0.0.0.0/0 to the private NAT gateway in the blackhole subnet (e.g., the private NAT gateway 214 of the blackhole subnet 208). The private NAT gateway in the blackhole subnet may, upon receiving these ingress traffic (i.e., ingress from the non-blackhole subnets), route these traffic from the non-blackhole subnets to the private ENI in the blackhole subnet.

According to the network scenario 300, the private subnet 322 may be configured to include the service instances similar to the private subnet 316. Some egress traffic from the private subnet 322 may be authorized to routed to Internet through a public NAT gateway 326 and the Internet gateway 324. Unauthorized egress traffic may be routed to the private NAT gateway in the blackhole subnet to be dropped out.

As discussed herein, one or more endpoint devices may be implemented to facilitate communications between the service instances in the private subnets located in different VPC of the cloud. For example, as shown in FIG. 3, the endpoint device 218 may be configured to facilitate communications between the private subnet 210 of VPC 204 and the private subnet 322 of VPC 310, and the endpoint device 308 may be configured to facilitate communications between the private subnet 306 of VPC 204 and the private subnet 316 of VPC 310.

The VPC peering 224, as illustrated, may provide network connections between the private subnets in the VPC 204 and the private subnets in the VPC 310. For example, the instances in the private subnet 210 of VPC 204 may communicate, through the VPC peering 224, with the instances in the private subnet 316 and/or the instances in the private subnet 322 of the VPC 310. In another example, the instances in the subnet 306 of VPC 204 may also communicate, through the VPC peering 224, with the instances in the private subnet 316 and/or the private subnet 322 of the VPC 310. In implementations, the instances in different private subnets may communicate with each other using private IPv4 addresses or IPv6 addresses.

Figure 4:
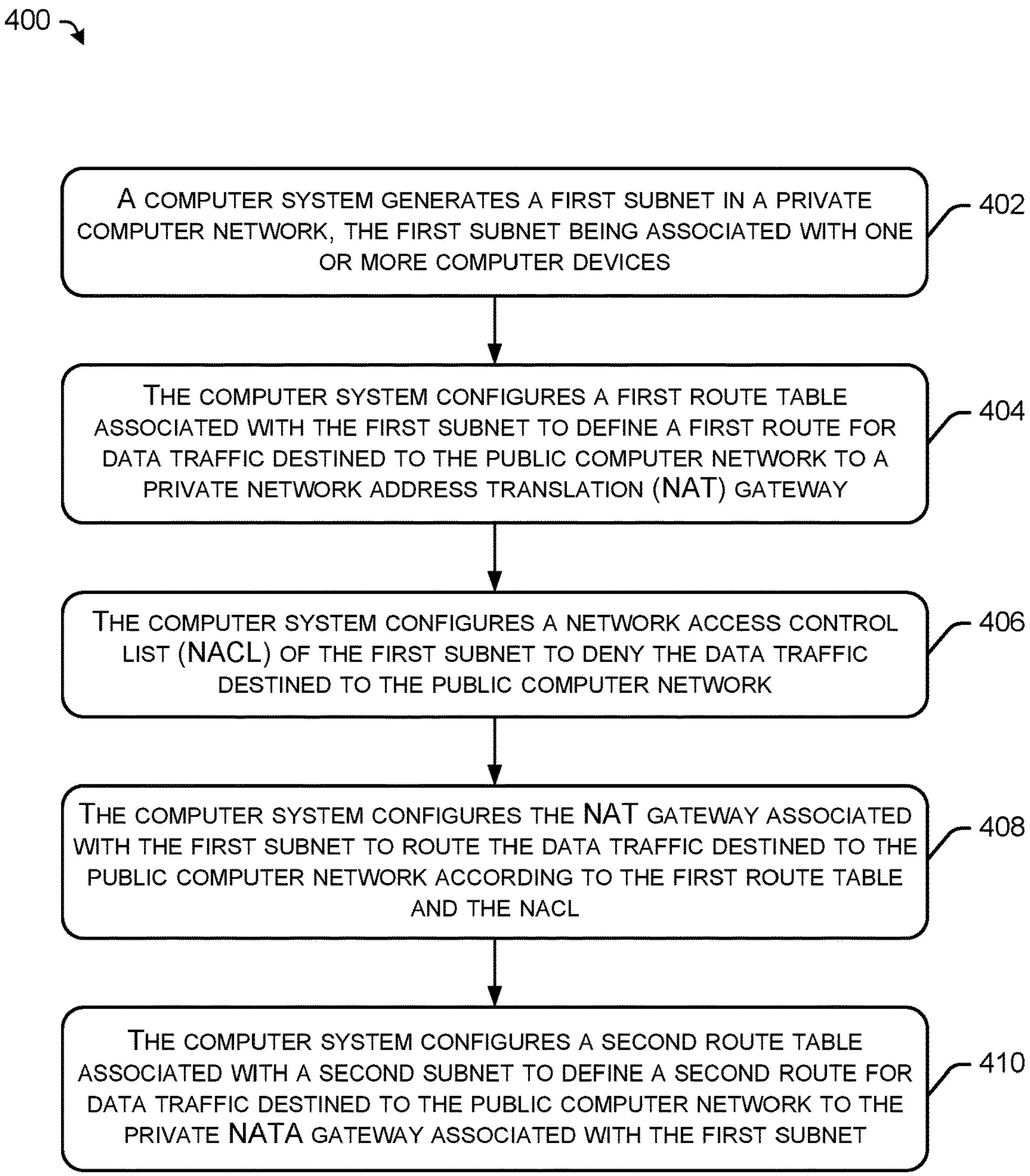
FIG. 4 illustrates an example flowchart for default-deny network egress control, according to an example of the present disclosure.

FIG. 4 illustrates an example flowchart for default-deny network egress control, according to an example of the present disclosure. The operations following the example flowchart 400 may be performed by one or more computer devices or computer servers of the private subnet 104(2), as shown in FIG. 1.

At operation 402, a computer system may generate a first subnet in a private computer network, the first subnet being associated with one or more computer devices. In some examples, the private computer network may be a virtual private cloud in a cloud environment, e.g., the VPC 204 in the cloud 202, as shown in FIG. 1. The computer system may include any computer device or computer server in the cloud environment that is configured to manage and distribute the cloud resources. As discussed herein, to implement default-deny network egress control in a cloud environment, the computer system may create a terminating subnet or a blackhole subnet in a virtual private cloud to achieve null routing for data packets destined to the Internet. The first subnet may be created as the terminating subnet or the blackhole subnet to perform default-deny network egress control, e.g., the blackhole subnet 208 created in the VPC 204, as shown in FIG. 2.

At operation 404, the computer system may configure a first route table associated with the first subnet to define a first route for data traffic destined to a public computer network to a private network address translation (NAT) gateway. The private NAT gateway has a private elastic network interface (ENI) assigned. In some examples, the computer system may deploy the private NAT gateway in the blackhole subnet, e.g., private NAT gateway 214 of FIG. 2. The computer system may define a default route for data traffic with a destination IP address 0.0.0.0/0 to be routed to the private NAT gateway. The data traffic with a destination IP address 0.0.0.0/0 may then be dropped out at the private NAT gateway, instead of being routed to the Internet.

At operation 406, the computer system may configure a network access control list (NACL) of the first subnet to deny the data traffic destined to the public computer network. According to the default-deny network egress control policy, all data traffic to the Internet from the cloud may be automatically rejected at the blackhole subnet created in a VPC of the cloud. In some examples, exceptions may be made to certain types of data traffic such as, data traffic related to core cloud services, DNS services, network time protocol (NTP) services, proxy services, etc. The NACL of the second subnet (i.e., the subnet other than the blackhole subnet) may define an allow list that authorizes certain IP addresses, domain names, email addresses, applications, etc., to access the resources in the Internet.

At operation 408, the computer system may configure the NAT gateway associated with the first subnet to route the data traffic destined to the public computer network according to the first route table and the NACL. As discussed herein, upon receiving the data packets, the private NAT gateway may be configured to triage the data traffic based on the destination IP addresses associated with the data packets. The data packet with a destination IP address 0.0.0.0/0 may be routed to the private ENI by default.

At operation 410, the computer system may configure a second route table associated with a second subnet to define a second route for data traffic destined to the public computer network to the private NAT gateway associated with the first subnet. As discussed herein, multiple VPCs may be created in a cloud environment. To achieve default-deny network egress control in the cloud environment, the computer system may configure all subnets other than the blackhole subnet in the cloud to route the data traffic destined to the Internet to the blackhole subnet. The computer system may configure the route tables in all other subnets to define the default routes to direct the data traffic destined to the Internet to the private NAT gateway in the blackhole subnet. For example, the route table associated with the private subnet 316 of VPC 310 may direct the data traffic destined to the Internet to the private NAT gateway 214 in the blackhole subnet 208 of VPC 204. As the private NAT gateway 214 in the blackhole subnet 208 is configured to forward the data traffic destined to the Internet to the private ENI 212, the data traffic unauthorized to access Internet may be rejected at the private ENI 212 by default.

Figure 5:
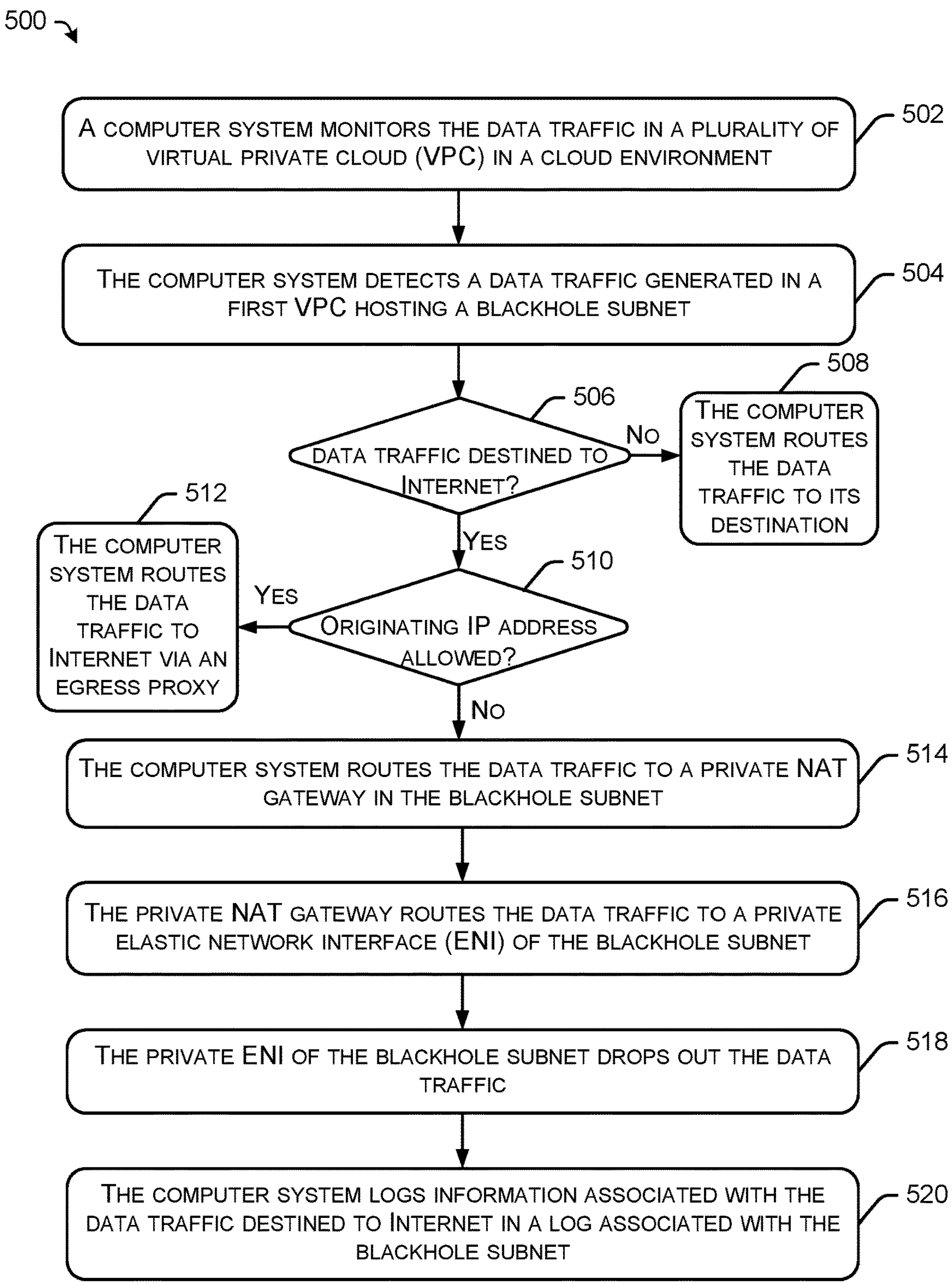
FIG. 5 illustrates another example flowchart for default-deny network egress control, according to an example of the present disclosure.

FIG. 5 illustrates another example flowchart for default-deny network egress control, according to an example of the present disclosure. The operations following the example flowchart 500 may be performed by one or more computer devices or computer servers of a private subnet in a virtual private cloud, as shown in FIG. 2.

At operation 502, a computer system may monitor data traffic in a plurality of virtual private cloud (VPC) in a cloud environment. The computer system may monitor the data traffic using built-in tools/software or third-party tools/software to filter data packets.

At operation 504, the computer system may detect a data traffic generated in a first VPC hosting a blackhole subnet. The computer system may view information in the IP header of the data packet including the originating IP address and the destination IP address. The computer system may determine the originating IP address of a data traffic falls in a range of a private VPC that hosts a blackhole subnet.

At operation 506, the computer system may determine whether the data traffic is destined to Internet. As discussed herein, an IP address 0.0.0.0/0 may indicate the destination of the data packet is Internet. If the data traffic is not destined to Internet, the computer system may route the data traffic to its destination, at operation 508. In some examples, the data traffic may be directed, through an endpoint device, to service instances hosted by another private subnet.

If the data traffic is destined to Internet, the computer system may determine whether an originating IP address is allowed to access Internet. The computer system may check an allow list against the egress proxy and determine whether the originating IP address is listed in the allow list. If the originating IP address is allowed to access Internet, the computer system may route the data traffic to Internet via an egress proxy, at operation 512. For example, the originating IP address may be associated with providing DNS services, network time protocol (NTP) services, proxy services. In some examples, the data traffic may be routed via VPC peering to an Internet gateway to egress the cloud environment.

If the originating IP address is not allowed to access Internet, the computer system may route the data traffic to a private NAT gateway in the blackhole subnet, at operation 514. In some examples, the computer system may configure a route table to include a default route for data traffic destined to Internet to be rejected by default.

At operation 516, the private NAT gateway may route the data traffic to a private elastic network interface (ENI) of the blackhole subnet. As discussed herein, the default route in the route table may be set that all data traffic destined to Internet is to be routed to the ENI of the blackhole subnet, except those related to DNS services or proxy services.

At operation 518, the private ENI of the blackhole subnet may drop out the data traffic.

At operation 520, the computer system may log information associated with the data traffic destined to Internet in a log associated with the blackhole subnet. In some examples, the information associated with the data traffic destined to Internet may include the originating IP address, app that is associated with generating the data traffic, an email address that is associated with generating the data traffic, etc.

Figure 6:
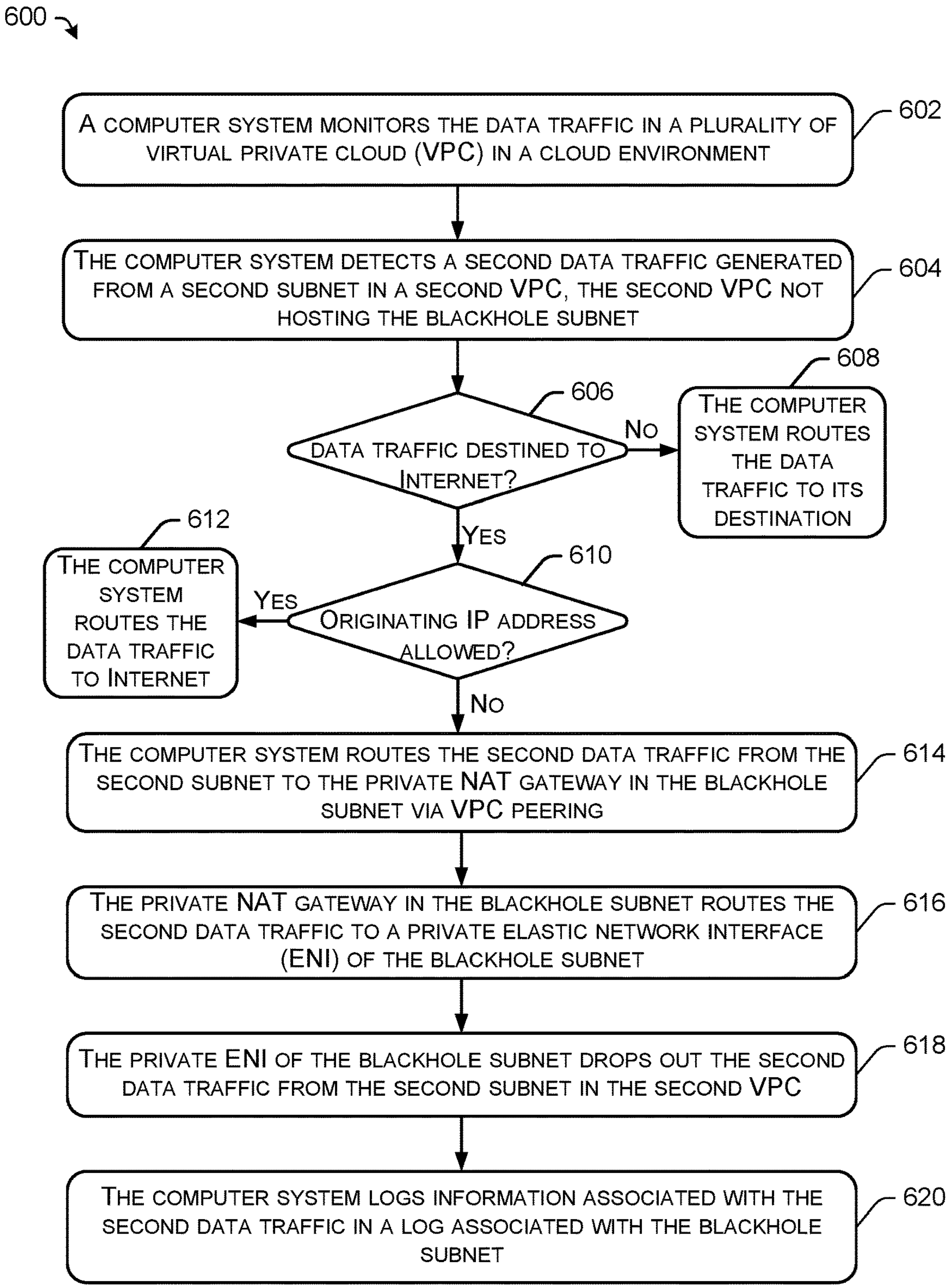
FIG. 6 illustrates yet another example flowchart for default-deny network egress control, according to an example of the present disclosure.

FIG. 6 illustrates yet another example flowchart for default-deny network egress control, according to an example of the present disclosure. The operations following the example flowchart 600 may be performed by one or more computer devices or computer servers in the private subnets associated with a cloud environment, as shown in FIG. 3.

At operation 602, a computer system may monitor data traffic in a plurality of virtual private cloud (VPC) in a cloud environment. In some examples, the computer system may also monitor the data traffic generated in a data center environment.

At operation 604, the computer system may detect a second data traffic generated from a second subnet in a second VPC, the second VPC not hosting the blackhole subnet. In implementations, the computer system may set up a VPC to host the blackhole subnet at the edge of the cloud. Other VPC created in the cloud may be non-blackhole VPC.

At operation 606, the computer system may determine whether the data traffic is destined to Internet. If the data traffic is not destined to Internet, the computer system may route the data traffic to its destination, at operation 608. If the data traffic is destined to Internet, the computer system may determine whether an originating IP address is allowed to access Internet, at operation 610. If the originating IP address is allowed to access Internet, the computer system may route the data traffic to Internet via an egress proxy, at operation 612.

If the originating IP address is not allowed to access Internet, the computer system may route the second data traffic from the second subnet to the private NAT gateway in the blackhole subnet via VPC peering at operation 614. As discussed herein, to implement the default-deny network egress control in the cloud, the computer system may configure a blackhole subnet with a private NAT gateway, a NACL, and a private ENI to enable null route for data packets not authorized to egress. In addition, the computer system may configure all other subnets (i.e., the non-blackhole subnets) to define a default route directed to the private NAT gateway in the blackhole subnet for data packets destined to Internet. Thus, the second data traffic from the second subnet and destined to Internet may be routed to the private NAT gateway in the blackhole subnet by default.

At operation 616, the private NAT gateway may route the second data traffic to a private elastic network interface (ENI) of the blackhole subnet. The private NAT gateway in the blackhole subnet may take the ingress data traffic from other private subnets and route the data traffic to ENI based on the route table defined therein.

At operation 618, the private ENI of the blackhole subnet may drop out the second data traffic from the second subnet in the second VPC.

At operation 620, the computer system may log information associated with the second data traffic in a log associated with the blackhole subnet.

The various techniques described herein may be implemented in the context of computer-executable instructions or software, such as program modules, which are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in unusual ways, depending on circumstances.

Similarly, software may be stored and distributed in numerous ways and using different means, and the particular software storage and execution configurations described above may be varied in many different ways. Thus, software implementing the techniques described above may be distributed on various types of computer-readable media, are not limited to the forms of memory that are specifically described.

Conclusion

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at various times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:

configuring a network access control list (NACL) of a first subnet in a private computer network to deny a traffic destined to a public computer network, the first subnet comprising a blackhole subnet; and configuring the first subnet in the private computer network, the first subnet associated with one or more computer devices that include a private network address translation (NAT) gateway and a private elastic network interface (ENI), to perform egress control including operations of:

receiving from a second subnet in the private computer network the traffic destined to the public computer network, and in response to the traffic not being authorized to egress to the public computer network, routing, by the private NAT gateway, the traffic to the private ENI, and discarding the traffic at the private ENI;

logging, at the private ENI, information associated with the traffic in a flow log associated with the blackhole subnet;

receiving additional traffic from the second subnet;

determining that the additional traffic is destined to the public computer network;

determining that the additional traffic includes a type of data qualifying as an exception from being discarded wherein the type of data includes data traffic related to core cloud services; and routing the additional traffic to the public computer network.

2. The method of claim 1, the method further comprises:

configuring a first route table associated with the first subnet to define a first route to the private NAT gateway for at least the traffic generated in the second subnet and destined to the public computer network.

3. The method of claim 2, further comprising:

configuring a second route table associated with the second subnet to define a second route for the traffic generated in the second subnet and destined to the public computer network to the private NAT gateway of the first subnet.

4. The method of claim 3, further comprising:

determining that a destination of the traffic is the public computer network;

routing the traffic to the private NAT gateway in the first subnet according to the second route defined in the second route table;

discarding, at the private NAT gateway in the first subnet, the traffic according to configuration of the NACL in the first subnet; and logging, at an ENI in the first subnet, information associated with the traffic.

5. The method of claim 1, wherein the private computer network is a virtual private cloud (VPC) associated with a cloud environment.

6. The method of claim 1, wherein the type of data includes data traffic related to at least one of DNS services, network time protocol (NTP) services, or proxy services.

7. The method of claim 1, further comprising generating a log entry in a Virtual Private Cloud (VPC) flow log indicating that the traffic was received and destined to the public computer network.

8. The method of claim 1, wherein the portion of the traffic includes at least one data packet with a destination IP address 0.0.0.0/0.

9. The method of claim 1, wherein the NACL includes at least one of an email address, an IP address, a domain name, or an application associated with the portion of the traffic.

10. The method of claim 1, further comprising establishing, via a proxy server, an HTTP connect tunnel for the additional traffic in response determining that the type of data qualifies as the exception from being discarded.

11. A computer system comprising:

a processor, a network interface, and a memory storing instructions executed by the processor to perform actions including:

configuring the first subnet in the private computer network, the first subnet associated with one or more computer devices that include a private network address translation (NAT) gateway and a private elastic network interface (ENI), to perform egress control including operations of:

receiving, from a second subnet from at least a second subnet, the traffic destined to the public computer network, and in response to the traffic not being authorized to egress to the public computer network, routing, by the private NAT gateway, the traffic to the private ENI, and discarding the traffic at the private ENI;

logging, at the private ENI, information associated with the traffic in a flow log associated with the blackhole subnet;

receiving additional traffic from the second subnet;

determining that the additional traffic is destined to the public computer network;

determining that the additional traffic includes a type of data qualifying as an exception from being discarded wherein the type of data includes data traffic related to core cloud services; and routing the additional traffic to the public computer network.

12. The computer system of claim 11, wherein the processor further performs actions including:

configuring a first route table associated with the first subnet to define a first route to the private NAT gateway for at least the traffic generated in the second subnet and destined to the public computer network.

13. The computer system of claim 12, wherein the processor further performs actions including:

configuring a second route table associated with the second subnet to define a second route for the traffic generated in the second subnet and destined to the public computer network to the private NAT gateway of the first subnet.

14. The computer system of claim 13, wherein the processor further performs actions including:

determining that a destination of the traffic is the public computer network;

routing the traffic to the private NAT gateway in the first subnet according to the second route defined in the second route table;

discarding, at the private NAT gateway in the first subnet, the traffic according to configuration of the NACL in the first subnet; and logging, at an ENI in the first subnet, information associated with the traffic.

15. The computer system of claim 11, wherein the private computer network is a virtual private cloud (VPC) associated with a cloud environment.

16. A non-transitory computer-readable storage medium storing computer-readable instructions, that when executed by a processor, cause the processor to perform operations including:

configuring a network access control list (NACL) of a first subnet in a private computer network to deny a traffic destined to a public computer network, the first subnet comprising a blackhole subnet; and configuring the first subnet in the private computer network, the first subnet associated with one or more computer devices that include a private network address translation (NAT) gateway and a private elastic network interface (ENI), to perform egress control including operations of:

receiving, from a second subnet in the private computer network, the traffic destined to the public computer network, in response to the traffic not being authorized to egress to the public computer network, routing, by the private NAT gateway, the traffic to the private ENI, and discarding the traffic at the private ENI;

logging, at the private ENI, information associated with the traffic in a flow log associated with the blackhole subnet;

receiving additional traffic from the second subnet;

determining that the additional traffic is destined to the public computer network;

determining that the additional traffic includes a type of data qualifying as an exception from being discarded wherein the type of data includes data traffic related to core cloud services; and routing the additional traffic to the public computer network.

17. The non-transitory computer-readable storage medium of claim 16, wherein the processor is caused to perform further operations including:

configuring a first route table associated with the first subnet to define a first route to the private NAT gateway for at least the traffic generated in the second subnet and destined to the public computer network.

18. The non-transitory computer-readable storage medium of claim 17, wherein the processor is caused to perform further operations including:

configuring a second route table associated with the second subnet to define a second route for the traffic generated in the second subnet and destined to the public computer network to the private NAT gateway of the first subnet.

19. The non-transitory computer-readable storage medium of claim 18, wherein the processor is caused to perform further operations including:

determining that a destination of the traffic is the public computer network;

routing the traffic to the private NAT gateway in the first subnet according to the second route defined in the second route table;

discarding, at the private NAT gateway in the first subnet, the traffic according to configuration of the NACL in the first subnet; and logging, at an ENI in the first subnet, information associated with the traffic.

20. The non-transitory computer-readable storage medium of claim 16, wherein the private computer network is a virtual private cloud (VPC) associated with a cloud environment.

* * * * *